US012774176B2

(12) United States Patent
Ragan

(10) Patent No.: US 12,774,176 B2
(45) Date of Patent: Oct. 27, 2026

(54) EXPANDABLE FLIGHT FOR A CONVEYOR

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 86 days.

(21) Appl. No.: 18/858,530

(22) PCT Filed: Apr. 4, 2023

(86) PCT No.: PCT/US2023/017436
§ 371 (c)(1),
(2) Date: Oct. 21, 2024

(87) PCT Pub. No.: WO2023/211643
PCT Pub. Date: Nov. 2, 2023

(65) Prior Publication Data

US 2025/0282553 A1 Sep. 11, 2025

Related U.S. Application Data

(60) Provisional application No. 63/334,754, filed on Apr. 26, 2022.

(51) Int. Cl.
*B65G 54/02* (2006.01)
*B65G 19/02* (2006.01)
*B65G 47/28* (2006.01)

(52) U.S. Cl.
CPC ............. *B65G 54/02* (2013.01); *B65G 19/02* (2013.01); *B65G 47/28* (2013.01); *B65G 2207/08* (2013.01)

(58) Field of Classification Search
CPC ........ B65G 15/42; B65G 15/44; B65G 15/58; B65G 17/46; B65G 19/02; B65G 19/225; B65G 19/245; B65G 19/265; B65G 47/28; B65G 47/845; B65G 54/02; B65G 2207/08
See application file for complete search history.

(56) References Cited

U.S. PATENT DOCUMENTS 4,759,436 A 7/1988 Persson
5,038,919 A 8/1991 Harston
(Continued)

FOREIGN PATENT DOCUMENTS

CN 212952882 U 4/2021
CN 113232929 A 8/2021
(Continued)

OTHER PUBLICATIONS

Extended European Search Report, European Patent Application No. 23797004.1, dated Mar. 12, 2026, European Patent Office, Munich, Germany.

*Primary Examiner* — Gene O Crawford
*Assistant Examiner* — Keith R Campbell
(74) *Attorney, Agent, or Firm* — Catherine M. Bishop

(57) ABSTRACT

A conveying system employs expandable flights for controlling the spacing of objects conveyed by a conveyor. Each flight includes a body portion comprising a pair of panels separated by an expandable linkage system. The flight is pivotally mounted to a mover of a linear transport system via a mounting portion so that the flight can be moved independently of the conveyor.

19 Claims, 6 Drawing Sheets

(56) References Cited

U.S. PATENT DOCUMENTS

| | | | | | |
|---|---|---|---|---|---|
| 5,360,099 | A * | 11/1994 | Culpepper | B65B 35/24 198/803.11 |
| 8,430,232 | B2 | 4/2013 | Baldanza et al. | |
| 9,403,611 | B2 * | 8/2016 | Sacchetti | B65G 47/842 |
| 11,807,462 | B2 * | 11/2023 | Bonnain | B65G 37/005 |
| 11,807,473 | B2 * | 11/2023 | Fourney | B65G 47/8823 |
| 2005/0103602 | A1 * | 5/2005 | Hartness | B65G 17/323 198/850 |
| 2016/0176659 | A1 * | 6/2016 | Aumann | B65G 54/02 198/619 |
| 2022/0250852 | A1 | 8/2022 | Layne | |

FOREIGN PATENT DOCUMENTS

| | | | |
|---|---|---|---|
| EP | 3744649 | A1 | 2/2020 |
| FR | 3073832 | A1 | 5/2019 |
| JP | 06-191616 | A | 7/1994 |
| JP | 08-258967 | A | 10/1996 |
| JP | 2021-155213 | A | 10/2021 |

* cited by examiner

EXPANDABLE FLIGHT FOR A CONVEYOR

RELATED APPLICATIONS

The present application claims priority to U.S. Provisional Patent Application No. 63/334,754, entitled "Expandable Flight for a Conveyor", filed Apr. 26, 2022, the contents of which are herein incorporated by reference.

BACKGROUND OF THE INVENTION

The present invention relates to the field of power-driven conveyors. More particularly, the invention relates to a system and method for controlling the spacing of conveyed objects.

It is often desirable to space conveyed objects in a selected manner along the travel direction of a conveyor, such as a conveyor belt. The spacing enables downstream processing, such as sorting by diverting of selected objects onto an exit conveyor. For example, it may be desirable to have only one package on a section of a conveying system, such as a diverter, at a time. If the packages are of different sizes, such as often occurs in the shipping industry, then the spacing of packages should be varied in order to ensure that only one package is on the selected section at a time, while maintaining the smallest possible gap between packages. In addition, non-regular packages, such as envelopes and bags may be difficult for flights used to space the conveyed objects to operate.

SUMMARY OF THE INVENTION

In one embodiment, a flight for a conveyor comprises an expandable body and a mounting portion for mounting the expandable body relative to the conveyor. The expandable body comprises a first panel, a second panel and a linkage system between the first panel and the second panel for selectively moving the second panel relative to the first panel. The mounting portion is connected to the first panel.

In another embodiment, a conveyor system for conveying and spacing articles comprises a conveyor having a conveying surface extending longitudinally from a first end to a second end and a plurality of flights extending laterally over the conveying surface. Each flight has an expandable body that can expand longitudinally.

DETAILED DESCRIPTION OF THE INVENTION

A conveying system includes a dynamic, expandable flight to control and vary the spacing of conveyed objects. The present invention will be described below relative to certain illustrative embodiments. Those skilled in the art will appreciate that the present invention may be implemented in a number of different applications and embodiments and is not specifically limited in its application to the particular embodiments depicted.

Figure 1:
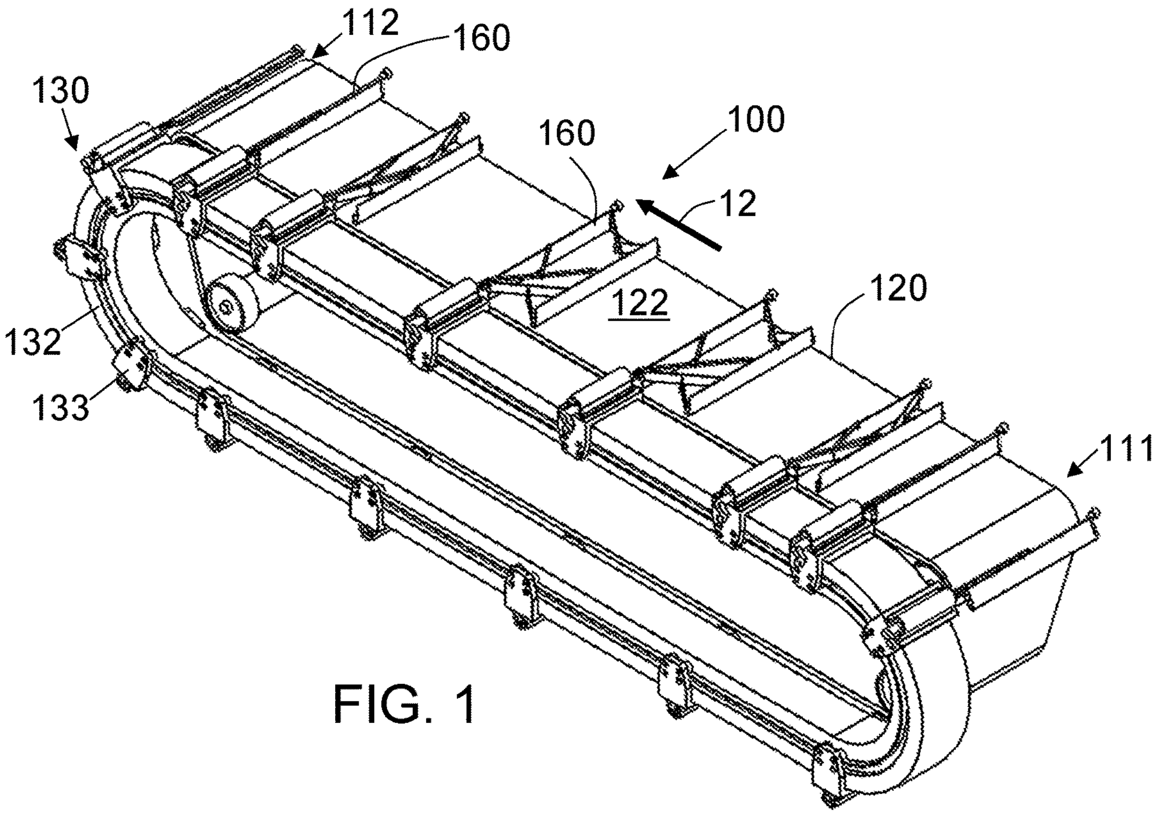
FIG. 1 is an isometric view of a dynamic gapping conveying system according to an embodiment.
Figure 2:
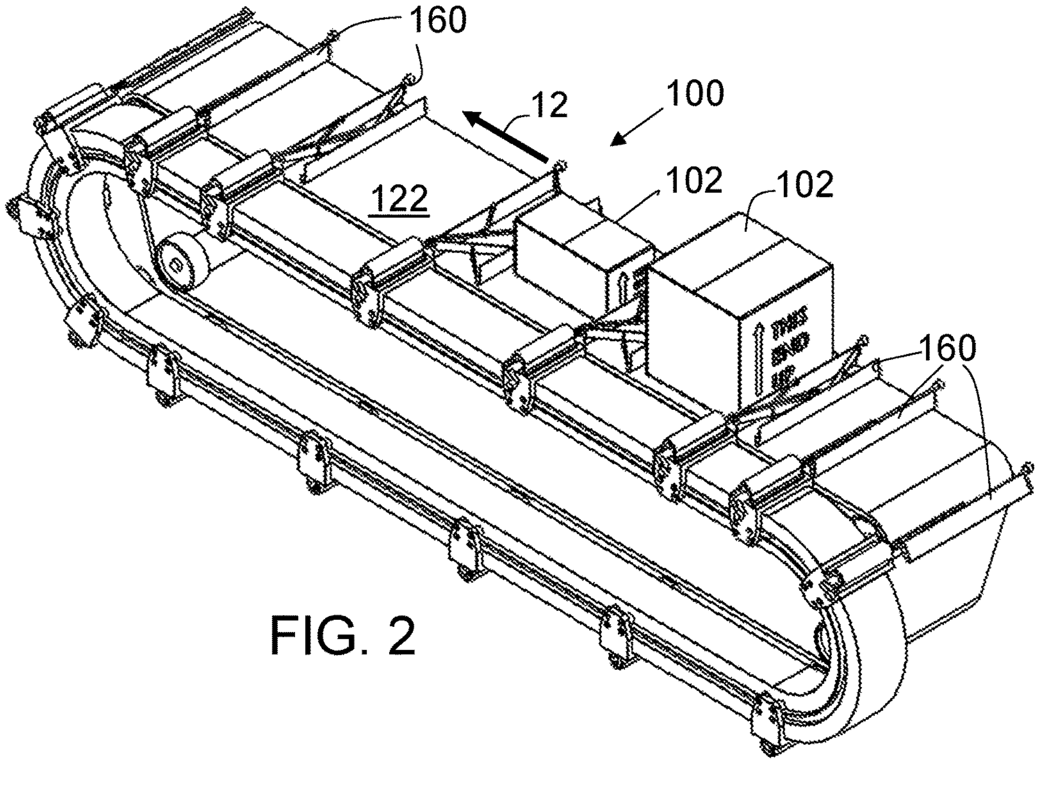
FIG. 2 is an isometric view of the dynamic gapping conveying system of FIG. 1 with parcels gapped and conveyed.

FIGS. 1 and 2 show a dynamic gapping conveying system 100 employing dynamic, expandable flights. The dynamic gapping conveying system includes a conveyor 120 that moves objects from the first end 111 to the second end 112 in a conveying direction 12. A dynamic gapping system 130 runs concurrent with the conveyor 120 and includes independent flights 160 for spacing objects conveyed by the conveyor. For example, the dynamic gapping system 130 may control and maintain a consistent gap between packages 102 of different sizes to increase throughput. The dynamic gapping system 130 comprises a linear transport system connected to a plurality of flights 160 that extend laterally over the conveyor conveying surface 122. The illustrative flights 160 are controlled separately from the conveying surface 122. The illustrative flights 160 are expandable to adjust a gap between conveyed parcels 102, as shown in FIG. 2. If a smaller gap is desired, a flight 160 may be compressed. If a larger gap is desired, a flight 160 may be expanded to provide a selected gap size.

The illustrative conveyor 120 comprises as an endless conveyor belt 120 trained around guide devices at each end 111, 112, defining a top conveying surface 122 and forming a returnway below the carryway to form a complete circuit. A driver, such as a sprocket driven by a motor, moves the conveyor belt 120 through the circuit to move objects from the first end 111 to the second end 112. The conveyor carryway extends longitudinally from the first end 111, which is the receiving end, to the second end 112, which is the discharge end, and laterally in width from a first side edge to a second side edge.

The invention is not limited to a conveyor belt for conveying objects, and any suitable means for conveying objects may be used. For example, the conveyor can comprise a low friction surface, rollers or another suitable conveyor.

The dynamic gapping system 130 includes a plurality of flights 160 extending laterally across the width, or a portion of the width, of the conveying surface 122, perpendicular to the conveying direction 12, for guiding conveyed objects. The flights 160 can serve as stops to limit the travel of objects 102, such as packages, to control their relative spacing on the conveying surface. Alternatively, or in addition, the flights 160 may serve as pushers for pushing the objects in the conveying direction.

In an illustrative embodiment of the invention, the flights 160 are driven independently from the conveying surface 122 and, in certain embodiments, each other. The flights 160 may be separated by a variable separation distance, which allows the flights 160 to be used to independently vary object spacing. The position of the flights 160 is longitudinally adjustable relative to the conveying surface 122 and-or each flight 160 may travel at a different speed than the conveying surface 122.

The illustrative flights 160 can be oriented in an operating position over the carryway. The illustrative flights can then be rotated and compressed to allow for travel around the reversing elements at the end of the carryway and through the conveyor returnway. Then, when a flight reenters the carryway, the flight 160 can rotate and expand to form a block for parcels 102 to set a predefined gap, as shown in FIG. 2.

In one embodiment, the flights 160 are driven by a linear transport system, comprising a plurality of movers 133 connected to the flights 160 and a motor module, such as a brushless BLDC motor or other type of linear magnetic motor, for propelling the movers, with each mover individually controlled. Each illustrative motor module comprises an endless, obround-shaped rail 132 on a side of the conveyor belt, substantially matching and adjacent the path of the conveyor belt 120, though the invention is not so limited. Alternatively, the rail 132 could return along a different path, such as above or outside of the carryway. The illustrative rail 132 includes inducers, such as embedded electromagnetic coils or other elements, that cooperate with elements, such as magnetic plates, in the movers 133 to propel the movers through the circuit formed by the rail 132 at a controlled and variable pace. Suitable linear transport systems are available from Rockwell Automation (the iTRACK® intelligent track system), Beckhoff Automation LLC of Savage, MN, B&R Automation of Eggelsberg, Austria, FESTO Corporation of Germany and other linear transport system providers known in the art.

Figure 3:
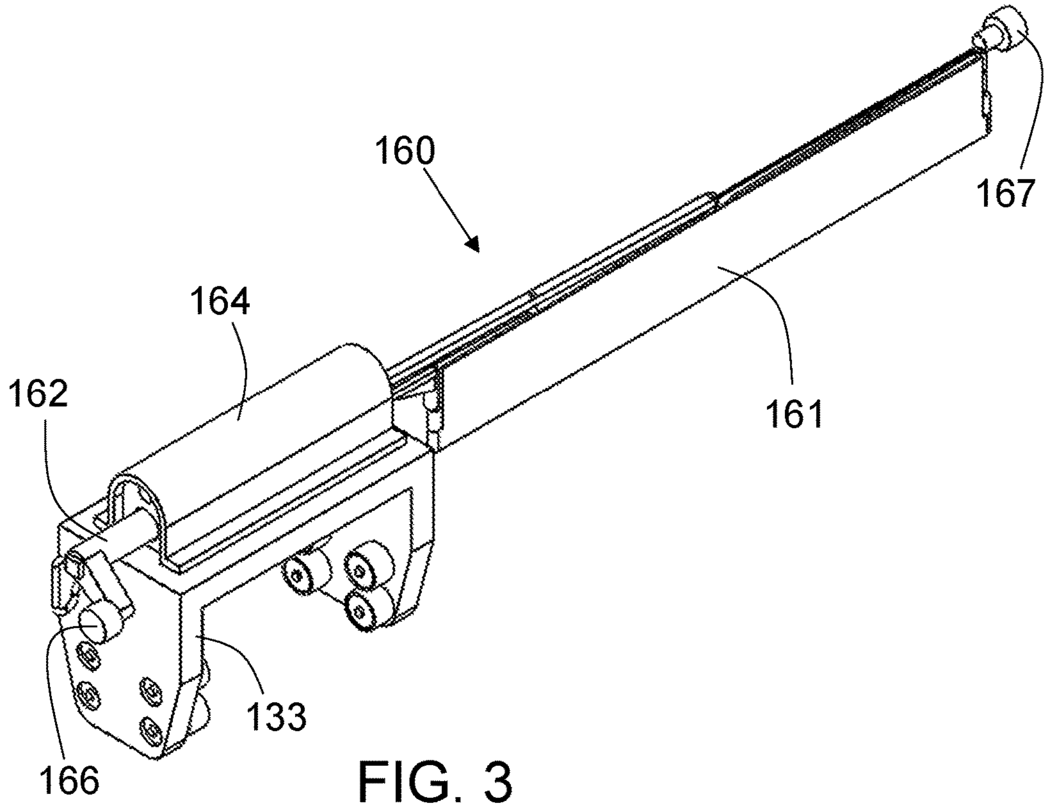
FIG. 3 is an isometric view of a flight with an expandable body in the dynamic gapping conveying system of FIG. 1.

Referring to FIG. 3 each illustrative flight 160 comprises an expandable body portion 161 and a mounting portion 162 that connects the body portion 161 to a mover 133 of the linear transport system so that when the mover 133 travels along the rail 132, the connected body portion 161 moves, too, creating dynamically assignable flights across the conveying surface 122. In one embodiment, the body portion 161 is pivotally mounted to the mover 133 to allow the body portion 161 to pivot relative to the mover 133 and the conveying surface 122. The illustrative mounting portion 162 is a mounting bar rotatably mounted in a sheath 164 on the mover 133.

The illustrative flight includes follower rollers 166, 167 at each end for engaging a track in the frame of the conveying system to control the rotational position of the flight. For example, the track and follower rollers may rotate the body 161 relative to the mover 133 to allow the flight to fit into a small space at the end of the carryway.

As shown in FIGS. 4-8, the expandable body portion 161 comprises a first panel 171 connected to the mounting portion 162 and a second panel 172 that is movable longitudinally relative to the first panel 171. Each panel extends laterally from an inner end adjacent the mounting portion 162 to a distal end and from a top edge to a bottom edge that is configured to extend over a conveying surface 122. Each panel is substantially flat and thin in thickness relative to height and width. A linkage mechanism selectively expands and collapses the body portion by moving the second panel 172 away from and towards the first panel 171. The linkage mechanism comprises an input link 181 pivotally connected at a first end to a retractable rod 180. The retractable rod 180 is housed in the mounting portion 162. The end of the mounting portion forms a channel 168 for exposing the end of the retractable rod. The tip 163 of the mounting portion is fixed to a first end of the first panel 171.

The input link 181 is pivotally connected at a second end to the second panel 172, preferably around the lateral middle of the second panel and at a top edge of the second panel 172, but the invention is not so limited. In an embodiment, the second panel 172 includes a pin that is received in a hinge knuckle at the second end of the input link 181.

Figure 4:
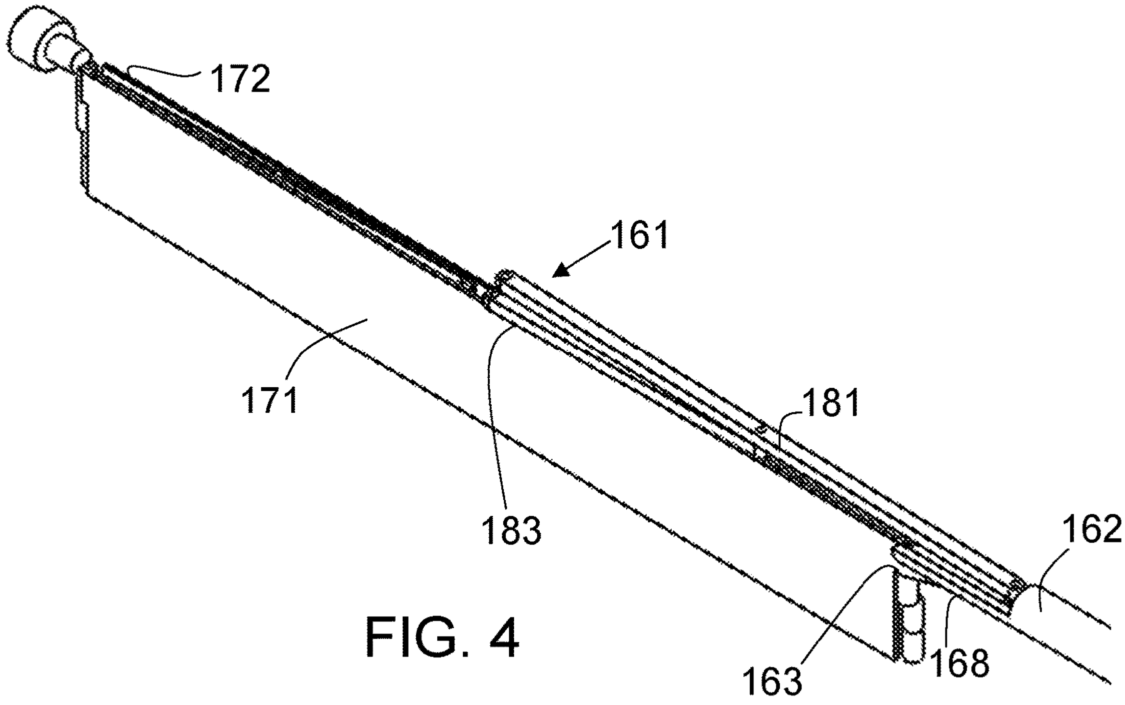
FIG. 4 is a detailed view of the body of the flight of FIG. 3 in a collapsed position.
Figure 5:
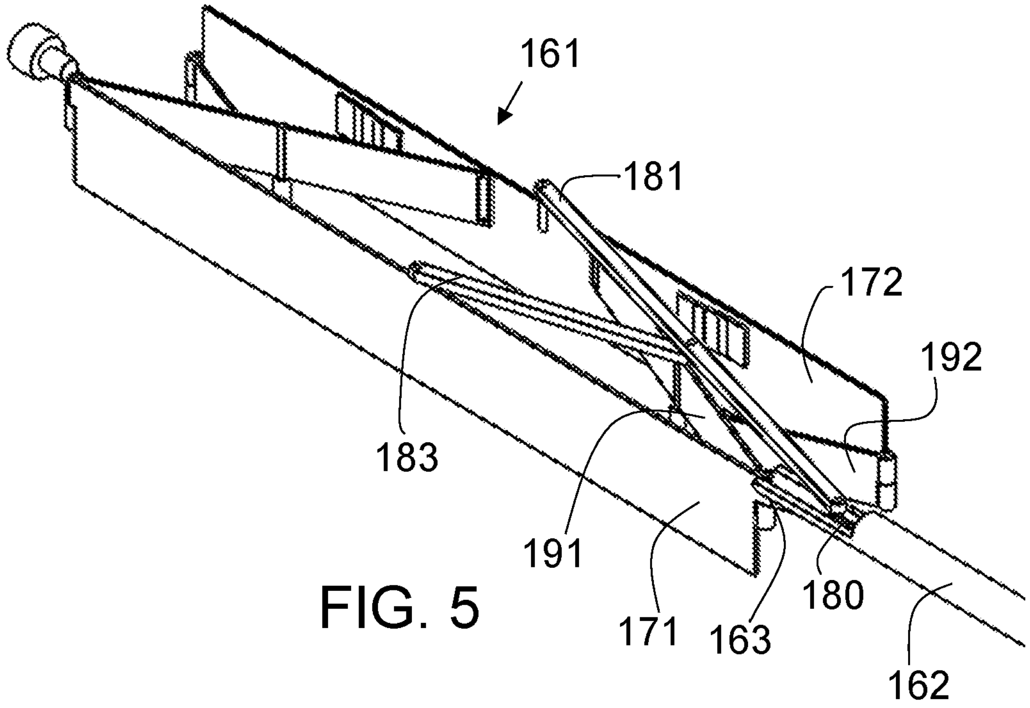
FIG. 5 is a detailed view of the body of FIG. 4 in a partially expanded position.
Figure 6:
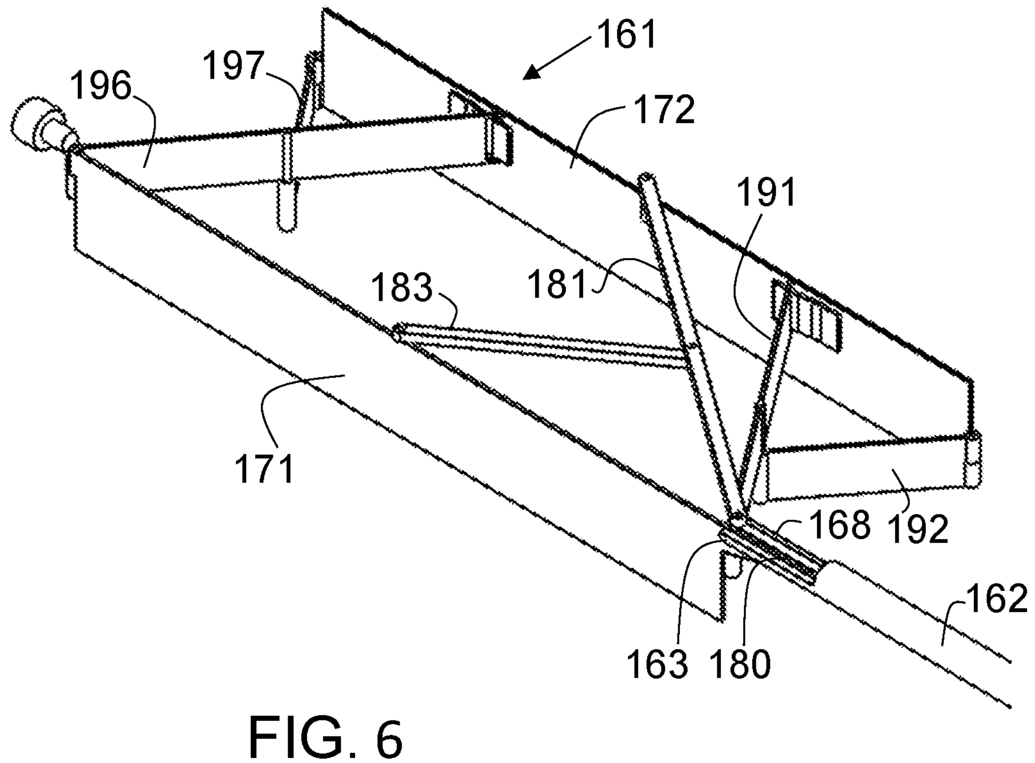
FIG. 6 is a detailed view of the body of FIG. 4 in an expanded position.
Figure 7:
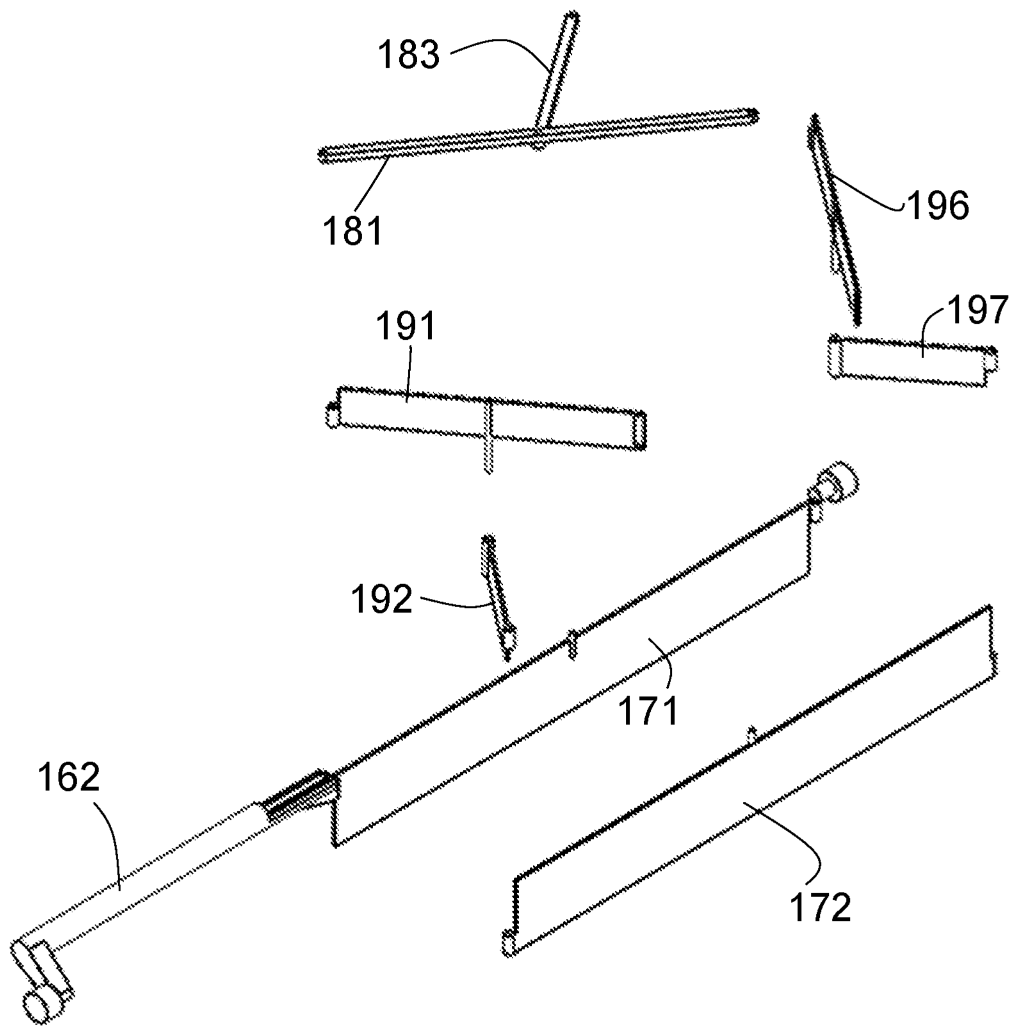
FIG. 7 is an exploded view of the body of FIG. 4.
Figure 8:
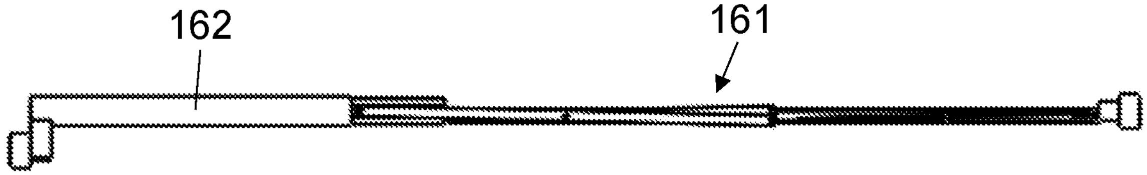
FIG. 8 is a top view of the body of FIG. 4.

A cross link 183 pivotally connects at a first end to a middle of the input link 181 and at a second end to the first panel. The first panel 171 may include a pin that is received in a hinge knuckle at the second end of the cross link 183. When the rod 180 is retracted within the mounting portion 162, the rod pulls the second panel 172 towards and adjacent to the first panel 171 so that the body is collapsed, as shown in FIGS. 4 and 8. To expand the body 161, the rod 180 can extend, as shown in FIGS. 5 and 6, pushing the second panel 172 away from the first panel 171.

Figure 9:
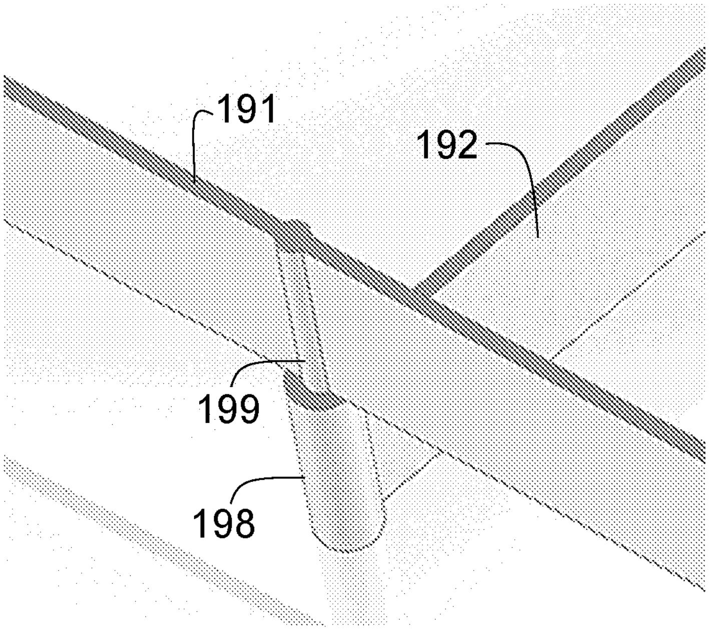
FIG. 9 is a detailed view of a hinged connection between two flat links of the body of FIG. 4.
Figure 10:
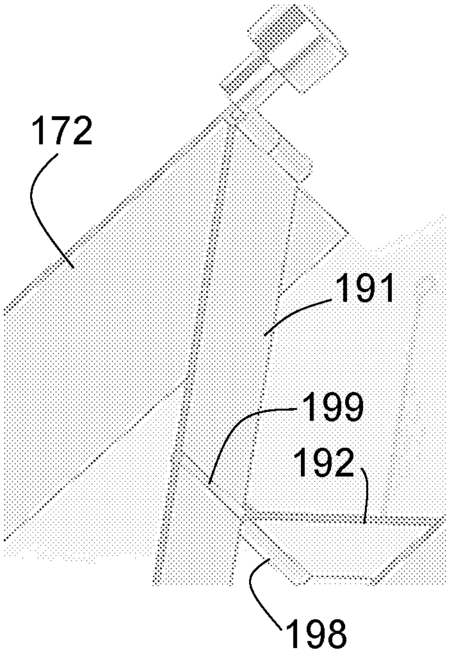
FIG. 10 is another view of the hinged connection of FIG. 9.

Reinforcing links can stiffen the body in the expanded position, while minimizing the thickness of the body when the panels are in the collapsed position, as shown in FIG. 8. The illustrative reinforcing links, shown in FIGS. 5-7, comprise a first set of flat links 191, 192 pivotally connected to each other and the panels 171, 172. The first flat link 191 is pivotally connected at a first end to the first panel 171 below the input link 181. The first flat link 191 extends to an inner surface of the second panel 172. The second flat link 192, shorter than the first flat link 191, extends below the first flat link 191 and is pivotally connected at a first end to a side edge of the second panel 172. The second end of the second flat link 192 is pivotally connected to the first flat link 191 by a hinge knuckle 198 that receives a pin 199 on the first flat link 191, as shown in FIGS. 9 and 10.

Figure 11:
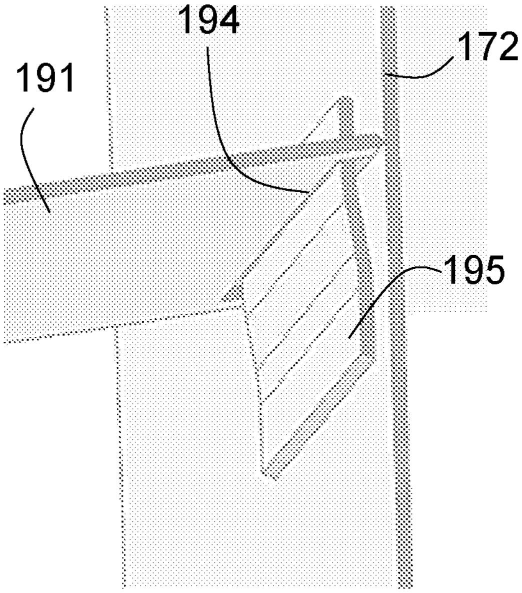
FIG. 11 is a detailed view of a latch for securing the body of FIG. 4 in an expanded position.

As shown in FIG. 11, the first flat link 191 includes an end slot 194 at the second end, which pushes on the second panel 172 during expansion. The inner surface of the second panel includes a latch 195 for securing the first flat link 191. The latch 195 is inserted in the end slot 194 in the expanded position to stiffen the expanded body and lock the body in the expanded position.

A second set of flat links 196, 197 is similarly connected to the panels 171, 172 and each other at an outer side of the body 161.

The illustrative linkage design minimizes the thickness of the body when the panels are in the collapsed position and facilitates selected rotation of the body 161 relative to the mover 133. Other linkage designs for selectively expanding the body may be used.

Figure 12:
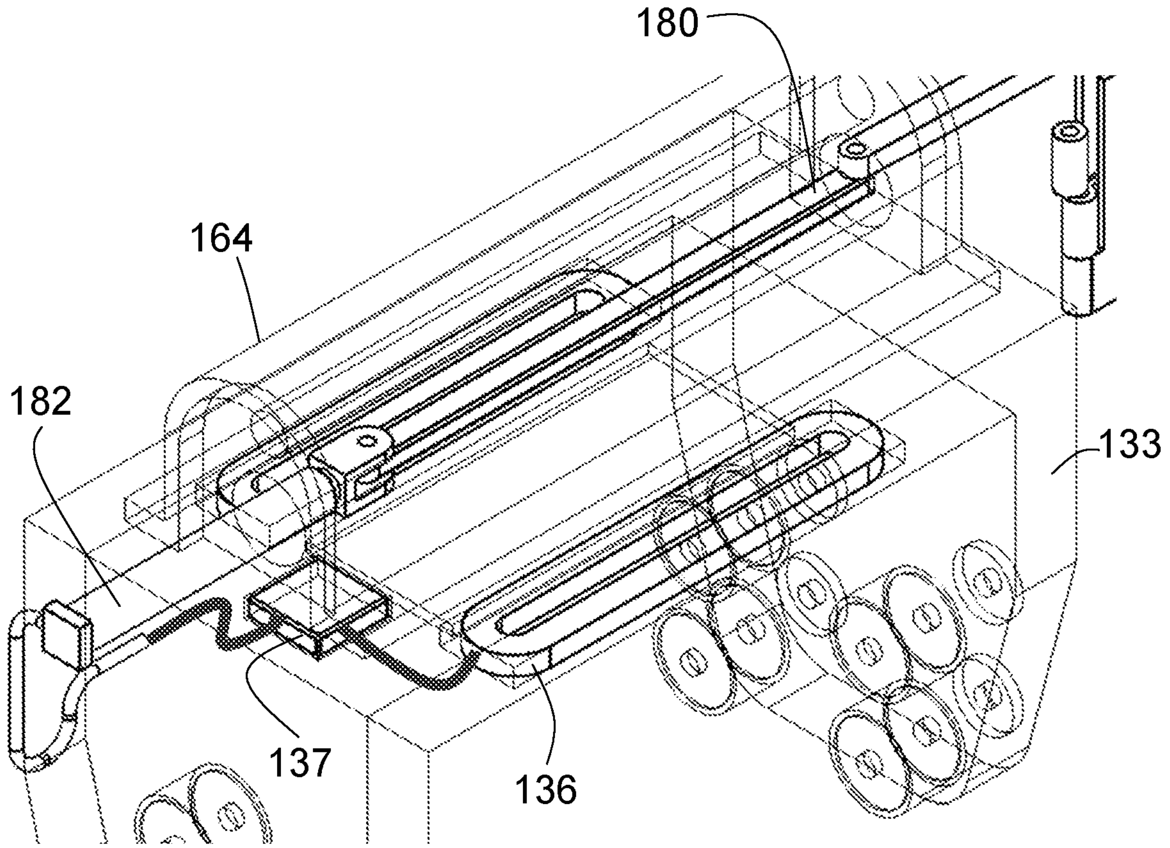
FIG. 12 is an isometric transparent view of the actuator for the linkage system of the flight of FIG. 3.

Referring to FIG. 12, an actuator 182 for the expandable rod 180 may be housed in the sheath 164. The actuator 182 may be powered from pickup coils 136 mounted in the mover 133 along with necessary rectifiers and control electronics 137, which connect to the actuator 182. The pickup coils derive power either from the same coils that drive the movers 133 or independent coils mounted alongside the mover coils. Actuator commands could also pass over the pickup coils or could be delivered wirelessly.

The invention has been described relative to certain illustrative embodiments. Those skilled in the art will appreciate that the present invention may be implemented in a number of different applications and embodiments and is not specifically limited in its application to the particular embodiments depicted.

What is claimed is:

1. A flight for a conveyor comprising:

an expandable body comprising a first panel, a second panel and a linkage system between the first panel and the second panel for selectively moving the second panel relative to the first panel, wherein the first panel includes a follower roller extending from a distal end for engaging a track on the conveyor to selectively rotate the flight; and a mounting portion connected to the first panel for mounting the expandable body relative to the conveyor.

2. The flight of claim 1, wherein the mounting portion comprises a mounting bar rotatably mounted in a sheath.

3. The flight of claim 2, wherein the sheath is mounted on a mover of a linear magnetic motor.

4. The flight of claim 2, wherein the mounting bar houses a retractable rod connected to the linkage system and an actuator for selectively extending and retracting the retractable rod.

5. The flight of claim 4, wherein the actuator is powered from pickup coils mounted in a mover of a linear magnetic motor to which the mounting portion is mounted.

6. The flight of claim 1, wherein the linkage system comprises:

a first link pivotally connected at a first end to a retractable rod, the first link pivotally connected to a lateral middle portion of the second panel at a second end; and a second link pivotally connected at a first end to a middle portion of the first link and at a second end to a middle portion of the first panel.

7. The flight of claim 6, wherein the retractable rod is housed in a sheath fixed to the first panel.

8. The flight of claim 6, wherein the linkage system further comprises a set of hingedly connected flat links below the first link and second link.

9. The flight of claim 8, wherein a first flat link includes an opening for latching onto a tab on an inner surface of the second panel.

10. A conveyor system for conveying and spacing articles, comprising:

a conveyor having a conveying surface extending longitudinally from a first end to a second end and a frame having a track; and a plurality of flights extending laterally over the conveying surface, each flight having an expandable body that can expand longitudinally and a follower roller for engaging the track to control the rotational position of the flight.

11. The conveyor system of claim 10, wherein each expandable body comprises a first panel, a second panel and a linkage system between the first panel and the second panel for selectively moving the second panel relative to the first panel; and each flight further comprises a mounting portion connected to the first panel for mounting the expandable body relative to the conveyor.

12. The conveyor system of claim 11, wherein each mounting portion comprises a mounting bar rotatably mounted in a sheath.

13. The conveyor system of claim 12, wherein the sheath is mounted on a mover of a linear magnetic motor.

14. A flight for a conveyor comprising:

an expandable body comprising a first panel, a second panel and a linkage system between the first panel and the second panel for selectively moving the second panel relative to the first pane; and a mounting portion connected to the first panel for mounting the expandable body relative to the conveyor, the mounting portion comprises a mounting bar rotatably mounted in a sheath mounted on a mover of a linear magnetic motor, the mounting bar housing a retractable rod connected to the linkage system and to an actuator for selectively extending and retracting the retractable rod.

15. The flight of claim 14, wherein the actuator is powered from pickup coils mounted in a mover of a linear magnetic motor to which the mounting portion is mounted.

16. A flight for a conveyor comprising:

an expandable body comprising a first panel, a second panel and a linkage system between the first panel and the second panel for selectively moving the second panel relative to the first panel, wherein the linkage system comprises a first link pivotally connected at a first end to a retractable rod, the first link pivotally connected to a lateral middle portion of the second panel at a second end, and a second link pivotally connected at a first end to a middle portion of the first link and at a second end to a middle portion of the first panel; and a mounting portion connected to the first panel for mounting the expandable body relative to the conveyor.

17. The flight of claim 16, wherein the retractable rod is housed in a sheath fixed to the first panel.

18. The flight of claim 16, wherein the linkage system further comprises a set of hingedly connected flat links below the first link and second link.

19. The flight of claim 18, wherein a first flat link includes an opening for latching onto a tab on an inner surface of the second panel.

* * * * *